Aug. 19, 1930.   E. W. LITTLE   1,773,465
ATTACHMENT FOR WELDING MACHINES
Filed May 27, 1929   4 Sheets-Sheet 3

Inventor
EARL W. LITTLE

By Owen H. Spencer
Attorney

Aug. 19, 1930.   E. W. LITTLE   1,773,465
ATTACHMENT FOR WELDING MACHINES
Filed May 27, 1929   4 Sheets-Sheet 4

Inventor
EARL W. LITTLE
By Owen H. Spencer
Attorney

Patented Aug. 19, 1930

1,773,465

UNITED STATES PATENT OFFICE

EARL W. LITTLE, OF INDIANAPOLIS, INDIANA

ATTACHMENT FOR WELDING MACHINES

Application filed May 27, 1929. Serial No. 366,142.

This invention relates to attachments for spot welding machines and of that class adapted primarily for manufacturing wire bird cages, although it will be understood that it may be used for many other purposes and one feature of the invention is the provision of an extension and means for attaching the same to the stationary arm of the spot welding machine.

A further feature of the invention is the provision of means in connection with the extension for supporting and spacing the wires forming the body of the cage in position to be welded together.

A further feature of the invention is the provision of means for adjustably and removably mounting the wire supporting and spacing parts on the extension.

A further feature of the invention is the provision of means for locking the parts in their adjusted positions.

A further feature of the invention is the provision of means for guiding a band forming wire as it is being welded to the remainder of the cage structure.

Other objects and advantages will be hereinafter more fully set forth and pointed out in the accompanying specification.

Figure 1:
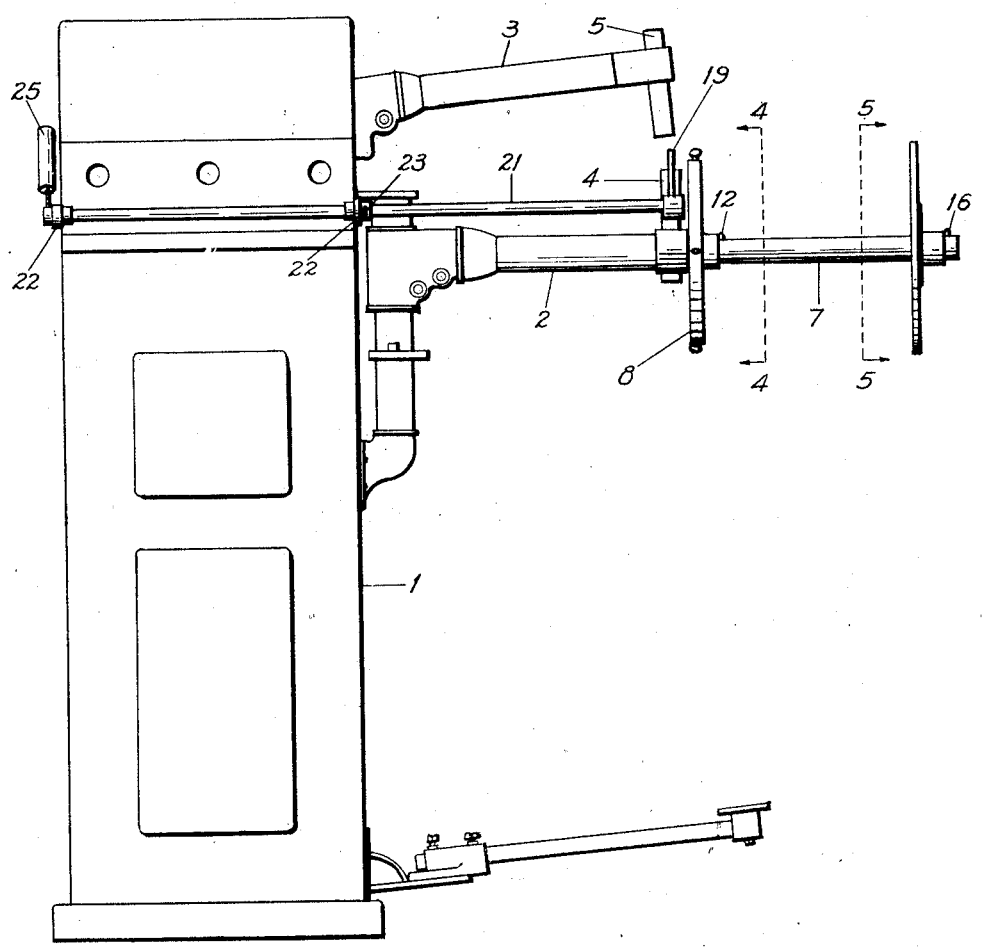
Figure 1 is a side elevation of a spot welding machine with the cage forming attachment in position thereon.
Figure 2:
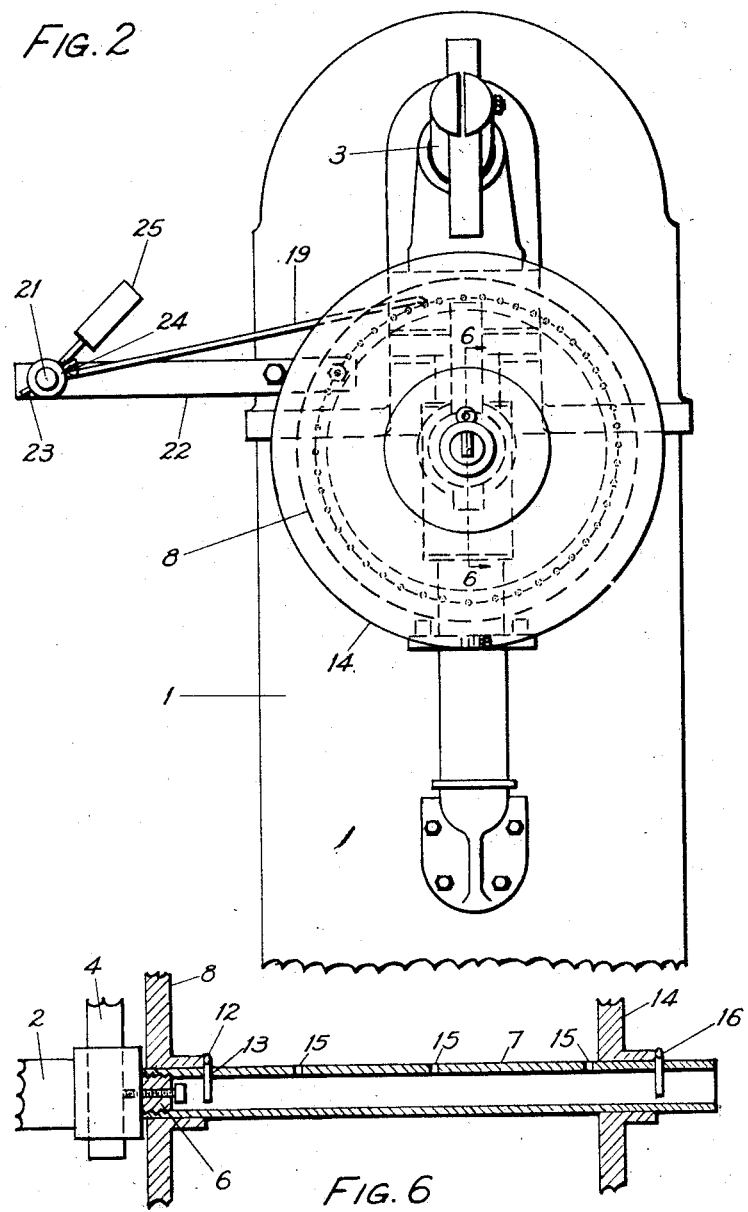
Figure 2 is a detail end elevation thereof.
Figure 6:
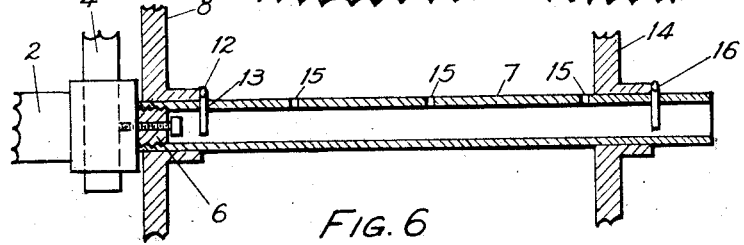
Figure 6 is an enlarged sectional view as seen along line 6—6, Fig. 2.
Figure 3:
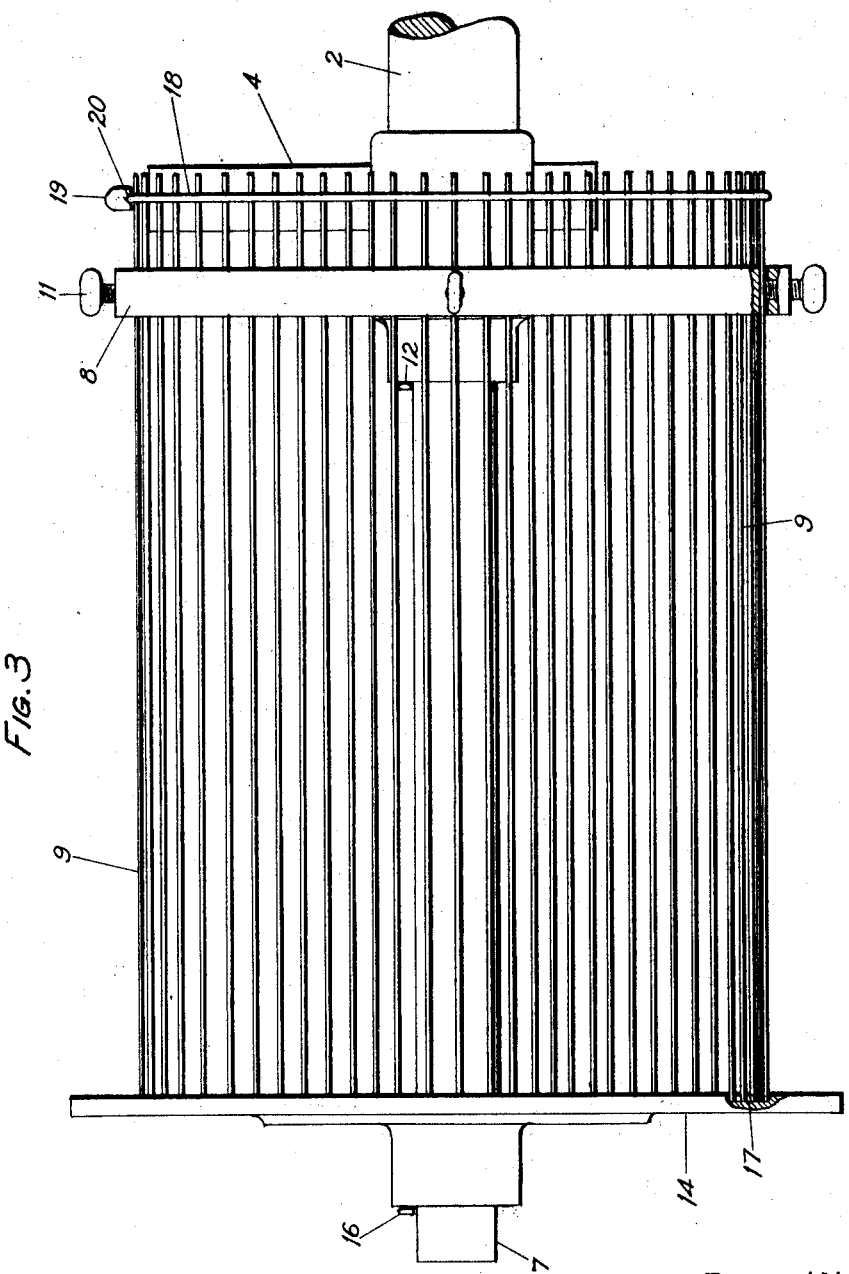
Figure 3 is an enlarged elevation of the attachment with cage forming wires thereon ready to be welded.
Figure 4:
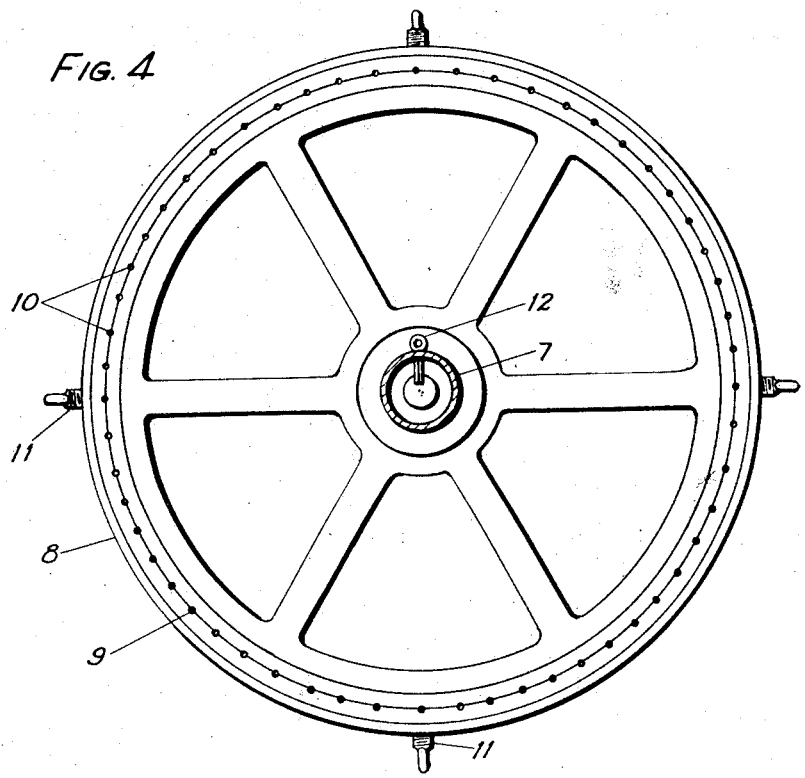
Figure 4 is an enlarged sectional view as seen along line 4—4, Fig. 1.
Figure 5:
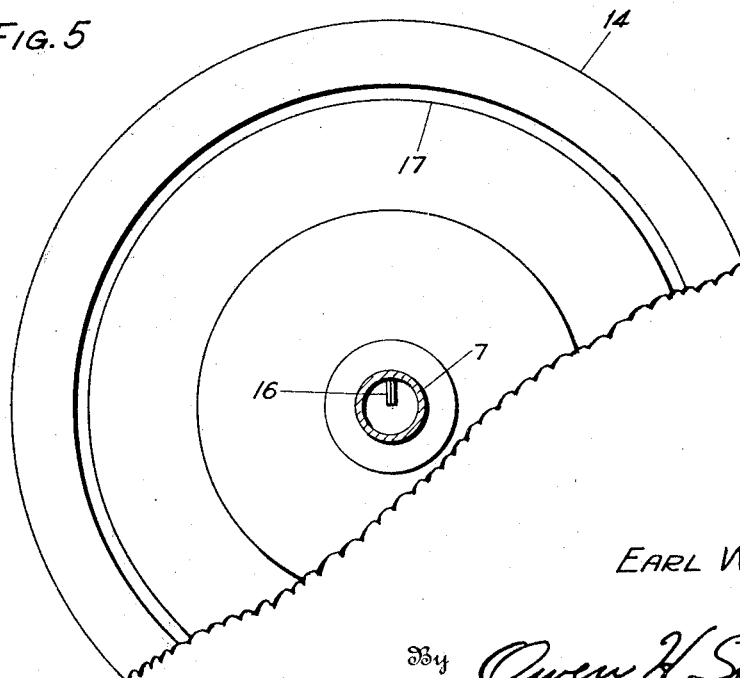
Figure 5 is a similar view as seen along line 5—5, Fig. 1.

Referring to the drawings in which similar reference numerals designate corresponding parts throughout the several views, the numeral 1 designates a spot welding machine, which is provided with a fixed arm 2 and a movable arm 3, said arms carrying adjacent their outer ends, electrodes or welding points 4 and 5, respectively.

The arm 2, beyond the electrode 4, is preferably provided with a hub 6, onto which is threaded a tubular shaft 7, and slidably mounted on said shaft 7 is a combined forming and spacing wheel 8, adapted to receive and support a plurality of wires 9 during the welding operation. The wires 9 are passed through bores 10 in the wheel 8 and preferably rest in a horizontal position while being welded, certain of said wires 9 preferably being engaged by clamping screws 11 placed at intervals around the periphery of the wheel. After the wires have been entered through the bores 10, the wheel is slipped onto the shaft 7 until it encounters the end of the arm 2, when a key 12 is inserted in an opening 13 in the shaft 7, thus holding the wheel from outward movement on the shaft, but permitting free rotating movement of the wheel and wires carried thereby. If desired, however, the shaft 7 may be made an integral part of the arm 2, or may be fixed rigidly to any preferred part of the machine 1.

After the wheel 8 has been properly placed on the shaft 7, a disc 14 is slipped onto the shaft 7, and in order to properly position the disc at prescribed points along the length of said shaft, a plurality of spaced openings 15 are formed in the shaft, with which cooperates a key 16.

The inner face of the disc 14 is preferably provided with a circular groove 17 for the reception of the outer ends of the wires 9, said groove forming a support and guide for the ends of the wires.

In order to assemble the wires 9 in cage formation and at the same time impart rigidity thereto, bands 18, preferably of wire, are disposed around the assembled wires 9 and attached thereto, preferably by spot welding the bands to the wires, and in order to properly guide the section of wire forming the band 18, a guide finger 19 is rested on the band adjacent the point where the weld is to be formed, said finger having a notch 20 in the end thereof, which straddles the band and feeds the same into position to be welded, as the wheel and wires 9 carried thereby are rotated.

The opposite end of the finger 19 is attached to a shaft 21, which is in turn mounted in brackets 22 carried by the machine 1, said shaft being rotatable so that the finger may be swung into or out of operative position. The shaft 21 is limited in its rotating movement by inserting a pin 23 through the shaft 21, the ends thereof striking against a post 24 on one of the brackets 22. The finger 19 is held in its different positions by attaching a counter weight 25 to the shaft 21.

In applying the device to use, the tubular shaft 7 is screwed onto the hub 6, after which a wheel 8, carrying a sufficient number of wires 9 to form the body of a bird cage, is slipped onto the shaft 7 until it strikes against the end of the arm 2.

The disc 14 is then introduced over the end of the shaft 7 and moved inwardly until the hub end thereof registers with the first opening 15. The key 16 is then introduced into said first opening 15 to prevent withdrawal or outward movement of the disc. This operation positions the forward ends of the wires 9 in position to receive the first band 18. Should the operator move the disc 14 beyond any one of the openings 15, the wires 9 may be forced by hand or otherwise, against the face of the disc 14, and the disc against its key, the outer ends of the wires resting in the groove 14. This will properly place the wires 9 to receive the first band 18, which is preferably formed by bending a section of wire in circular formation with the ends thereof free. The band is placed around the assembled wires 9 and the finger 19 then lowered until the notch 20 in the end thereof engages the band and as the finger is in direct line of the electrodes, the band will be engaged by the electrodes and be welded to the wires 9, when the electrode 5 is lowered into contact with the band 18 and one of the wires 9, the wire 9 resting on the end of the electrode 4. After each weld is made, the wheel 8 is rotated to bring another wire 9 above the electrode 4, when the electrode 5 is again lowered and another weld made, this operation being completed until the welding operation has been extended entirely around the cage structure.

As the wires 9 are heated to substantially a melting point, during the welding operation, they will easily bend, but by placing the wheel 8 adjacent the welding electrodes and entering the wires through the bores 10, the wires 9 will be held more or less rigid at their welding point, thus avoiding the possibility of the wires bending to such an extent as to form a distorted or misplaced weld and preventing the assembled wires from being distorted or misshaped.

The clamping screws 11 are then released and the wires 9 forced lengthwise through the wheel 8, by moving the disc 14 inwardly on the shaft 7 until the hub end registers with the next succeeding opening 15, or until the cage structure has been positioned to receive the next band, when the clamping screws are again tightened, a new band placed around the cage structure and the welding operation repeated, these operations being repeated until all the bands have been applied.

The finger 19 is then swung outwardly, the keys 12 and 16 removed from their respective openings and the disc 14 and wheel 8 then removed from the shaft, the wheel 8 carrying the assembled wires with it. The clamping screws 11 are again released, when the cage structure may be released from the wheel 8.

While the drawings show a round wire forming the band 18, it will be understood that a flat band may be used, or in fact any form of band, subject to being spot welded, may be used. It will likewise be seen that the openings 15 may be so arranged that the bands may be located at any suitable point in the length of the wires 9.

While the description and drawings illustrate in a general way, certain instrumentalities which may be employed in carrying the invention into effect, it is evident that many modifications may be made in the various details, without departing from the scope of the appended claims, it being understood that the invention is not restricted to the particular example herein described.

What I claim is:

1. A means for supporting individual wires of substantially uniform lengths in position to be welded into cage formation comprising a wheel like structure having a plurality of bores through which said wires extend, means for guiding a wire to be welded to the wheel carried wires, and means adapted to be forced against one end of said wheel carried wires for adjusting them endwise.

2. A means for supporting wires cut into individual lengths in position to be welded into cage formation, comprising a wheel like structure having a plurality of bores therethrough for the reception of wires, means adapted to be forced against the ends of said wires for adjusting them endwise, means for locking certain of said wires to said wheel like structure after each endwise adjustment of the wires, means for guiding a band forming member in position to be welded to said wires, and means for rotatably mounting said wheel like structure, whereby the wires may be successively brought to position to be welded with the band forming member.

3. A means for supporting a plurality of wires in position to be welded into cage formation, comprising a rotating wheel of fixed diameter and having a plurality of spaced bores to receive and support wires, means for guiding a band forming member in position to be welded to said wires, and means for pivotally mounting said guiding means whereby it may be moved into or out of operative position.

4. Means for supporting a plurality of wires in position to be welded into cage formation, comprising the combination with one arm of a welding machine, and an exteriorly threaded hub attached thereto, of a shaft attached to said hub, and means on the shaft for carrying a plurality of wires in position to be successively moved into welding position.

5. Means for supporting a plurality of wires cut in lengths for forming a cage structure, comprising a support, a combined forming and spacing wheel rotatable on said support, said wheel having a plurality of bores therethrough adjacent its peripheral edge, cage forming wires cut in lengths and adapted to be entered through said bores, band forming wires adapted to be attached at intervals to said first wires for assembling said wires in cage formation, and electrodes positioned to engage and weld said wires immediately in advance of said wheel, whereby said wires will be held against distortion during the welding operation.

6. Means for supporting a plurality of wires cut in cage forming lengths, comprising a support, a combined forming and spacing wheel removably attached to said support, and means slidable upon said support adapted to engage one end of said wires for successively adjusting said wires lengthwise.

7. Means for supporting a plurality of wires cut in lengths for forming a cage, comprising a support, a wheel removably attached to said support, said wheel having a plurality of spaced bores for the reception of said wires, a disc adapted to be moved lengthwise of said support for spacing the wires lengthwise through said wheel, and means for determining the various positions of said disc on said support.

In testimony whereof, I have hereunto set my hand on this the 22d day of May, 1929, A. D.

EARL W. LITTLE.